United States Patent [19]

Obara et al.

[11] Patent Number: 4,900,079
[45] Date of Patent: Feb. 13, 1990

[54] CONTROL SYSTEM FOR VEHICLE EQUIPMENT

[75] Inventors: Hideo Obara, Tokyo; Akira Kimitsuka, Yokohama; Takayuki Yanagishima, Yokosuka, all of Japan

[73] Assignee: Nissan Motor Co., Ltd., Yokohama, Japan

[21] Appl. No.: 186,253

[22] Filed: Apr. 26, 1988

[30] Foreign Application Priority Data

Jun. 9, 1987 [JP] Japan .............................. 62-88099[U]

[51] Int. Cl.[4] ............................................. A47C 15/00
[52] U.S. Cl. .................................... 296/65.1; 297/257
[58] Field of Search ................. 296/65.1, 64; 297/257, 297/346; 364/424, 425; 318/466, 467

[56] References Cited

U.S. PATENT DOCUMENTS 4,204,255  5/1980  Cremer ............................... 296/65.1
4,669,780  6/1987  Sakakibara et al. ................. 296/65.1
4,707,788 11/1987  Tashiro et al. ...................... 296/65.1

FOREIGN PATENT DOCUMENTS 58-33569  2/1983  Japan .
58-33570  2/1983  Japan .
58-33571  2/1983  Japan .

Primary Examiner—Sherman D. Basinger
Assistant Examiner—Stephen P. Avila
Attorney, Agent, or Firm—Pennie & Edmonds

[57] ABSTRACT

A system which automatically moves a drivers seat between one of a plurality of preselected driving positions and a position wherein ingress and egress is facilitated is inhibited when a passenger is seated on the seat behind the drivers one.

12 Claims, 13 Drawing Sheets

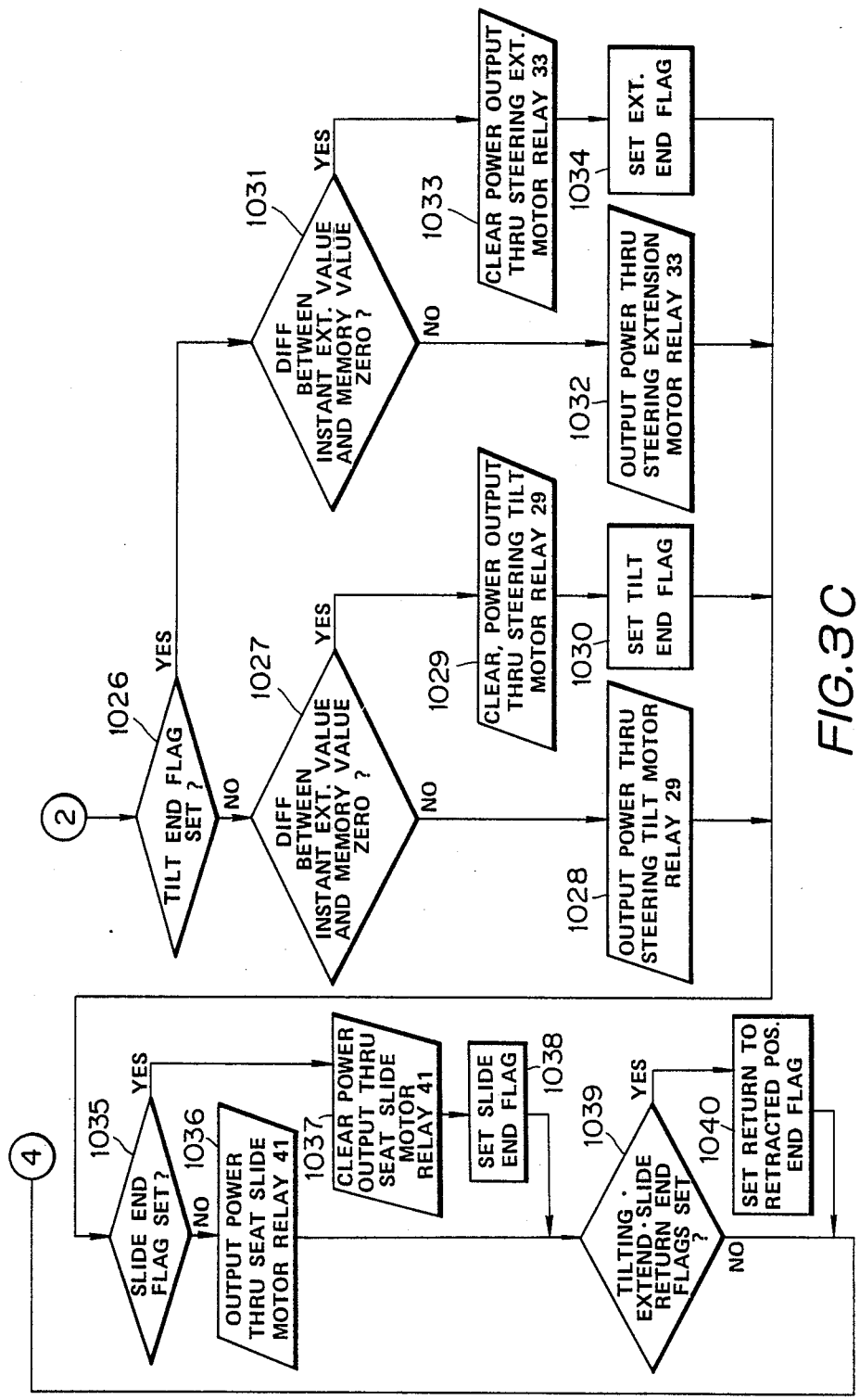

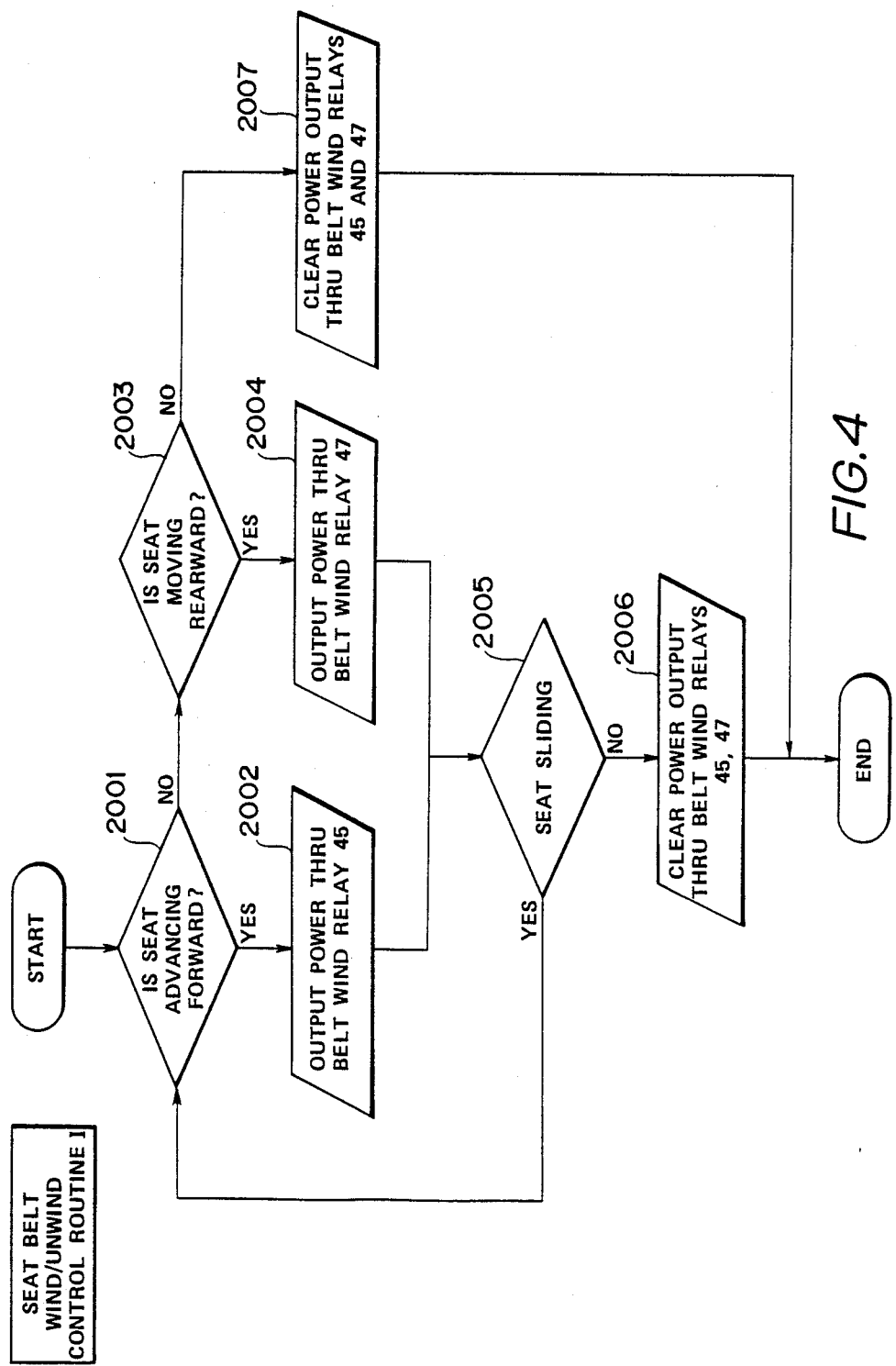

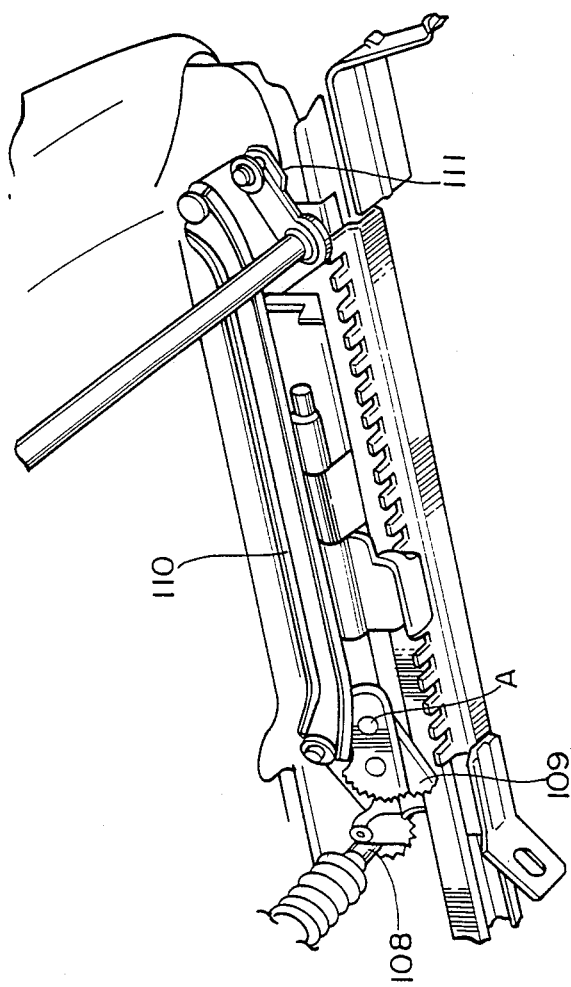

CONTROL SYSTEM FOR VEHICLE EQUIPMENT

BACKGROUND OF THE INVENTION

1. Field of the Invention

The present invention relates to a control system for controlling the position of vehicle equipment such as the seats and steering column of an automotive vehicle and the like and more specifically to a system which provides improved ease with which seats and other controls can be returned to "driving" positions from ones which permit ready ingress and egress and which avoids any inconvenience to rear seat passengers.

2. Description of the Prior Art

It has been previously proposed to provide the drivers seat and the steering column with servo motors and a memory arrangement which permit (a) the seat and the steering column to be automatically retracted to positions which enable easy ingress and egress and (b) to be returned to preselected memorized positions once the driver has entered the vehicle and become seated in the drivers seat.

These systems while being convenient from the view point of the driver have suffered from the drawback that the automatic rearward movement is made irrespective of the presence of a rear seat passenger whose leg room can be drastically reduced by the same.

Examples of such prior art can be found in JP-A-Nos. 58-33569, 58-33570 and 58-33571.

SUMMARY OF THE INVENTION

It is an object of the present invention to provide a seat control which can automatically move a drivers seat and ancillary equipment (such as the vehicle steering wheel external rear view mirrors and the like) and which inhibits movement of the seat toward the rear seat when a passenger is sensed as being seated thereon.

More specifically, a first aspect of the present invention takes the form of a vehicle which includes: a front seat; a rear seat; means for detecting the presence of a passenger on the rear seat; means for selectively moving the first seat forward and aft within the vehicle; a circuit including a memory, the memory arranged to be conditioned to retain a first predetermined seat position and a first selectable seat position, the circuit being operatively connected with the seat moving means, the circuit being arranged to induce the seat moving means to move the seat from the first predetermined position to the first selected one when the rear seat passenger detecting means indicates the absence of a passenger thereon.

A second aspect of the present invention comes in the form of a method of operating a vehicle having a front seat and a rear seat, the method featuring the steps of: memorizing a first predetermined seat position wherein ingress and egress from the vehicle is facilitated; memorizing a first desired seat position suited to driving in the vehicle; moving the seat to the first predetermined position in response to a signal indicative that the vehicle has stopped; moving the seat to the first desired position in response to a second signal indicative of the vehicle being conditioned to be driven; sensing the presence of a passenger on the rear seat; inhibiting the seat from moving from the first desired position to the first predetermined one in the event that the step of sensing indicates the presence of a passenger on the rear seat.

A third aspect of the present invention comes in the form of a vehicle having a front seat and a rear seat, the vehicle featuring: means for memorizing a first predetermined seat position wherein ingress and egress from the vehicle is facilitated; means for memorizing a first desired seat position suited to driving in the vehicle; means for moving the seat to the first predetermined position in response to a signal indicative that the vehicle has stopped; means for moving the seat to the first desired position in response to a second signal indicative of the vehicle being conditioned to be driven; means for sensing the presence of a passenger on the rear seat; means for inhibiting the seat from moving from the first desired position to the first predetermined one in the event that the sensing means indicates the presence of a passenger on the rear seat.

BRIEF DESCRIPTION OF THE DRAWINGS

FIGS. 3A to 3D show a flow chart depicting the operations which characterize the operation of the first embodiment;

FIG. 4 is a flow chart which shows the operations performed according to a seat belt slack control routine;

FIG. 8 is a perspective taken from below the seat showing in part the mechanism via which the seat is adjusted;

DESCRIPTION OF THE PREFERRED EMBODIMENTS

Figure 1:
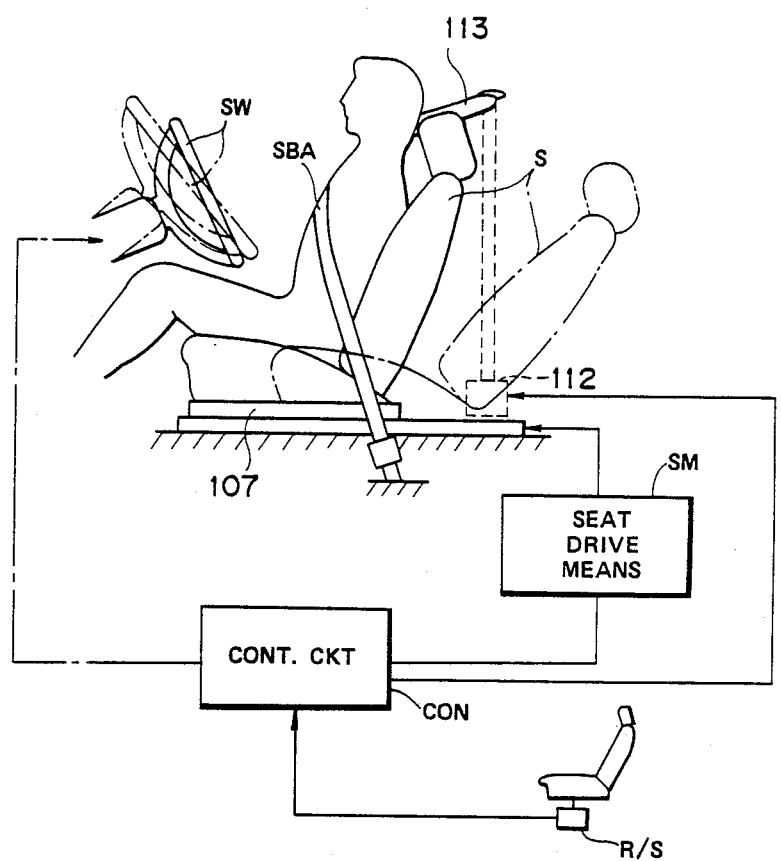
FIG. 1 is a schematic diagram showing an example of a seat/seat belt/ steering column arrangement and the various functions controlled in accordance with a first embodiment of the present invention.

FIG. 1 shows schematically the arrangement to which the present invention is applied. As shown, a control circuit CON is arranged to selectively control the movement of seat in the fore and aft directions by applying a suitable control input to the seat drive means SM. This device is operatively connected to the seat in a manner which enables the movement of the same along rails or the like secured to the floor of the vehicle. The control circuit CON is further connected to a seat belt retractor mechanism 112 in a manner to control the amount of seat belt 113 which is wound out or wound in, in accordance with the movement and/or position of the vehicle seat. In this figure the seat belt, retractor, buckle, buckle switch and the like are generally denoted by SBA.

As shown in phantom, the control circuit CON is also connected to a steering wheel arrangement SW in a manner which permits the angle (tilting) and the amount of telescoping or extension thereof to be simultaneously controlled in synchronism and/or with a predetermined timing with the movement of the seat and the operation of the seat belt retractor.

In accordance with the present invention a rear seat passenger detection switch R/S is operatively connected with the control circuit CON. In this embodiment the detection switch can take the form of a device which is responsive to given load being placed on the rear seat in a manner indicative of a person being seated thereon.

Figure 2:
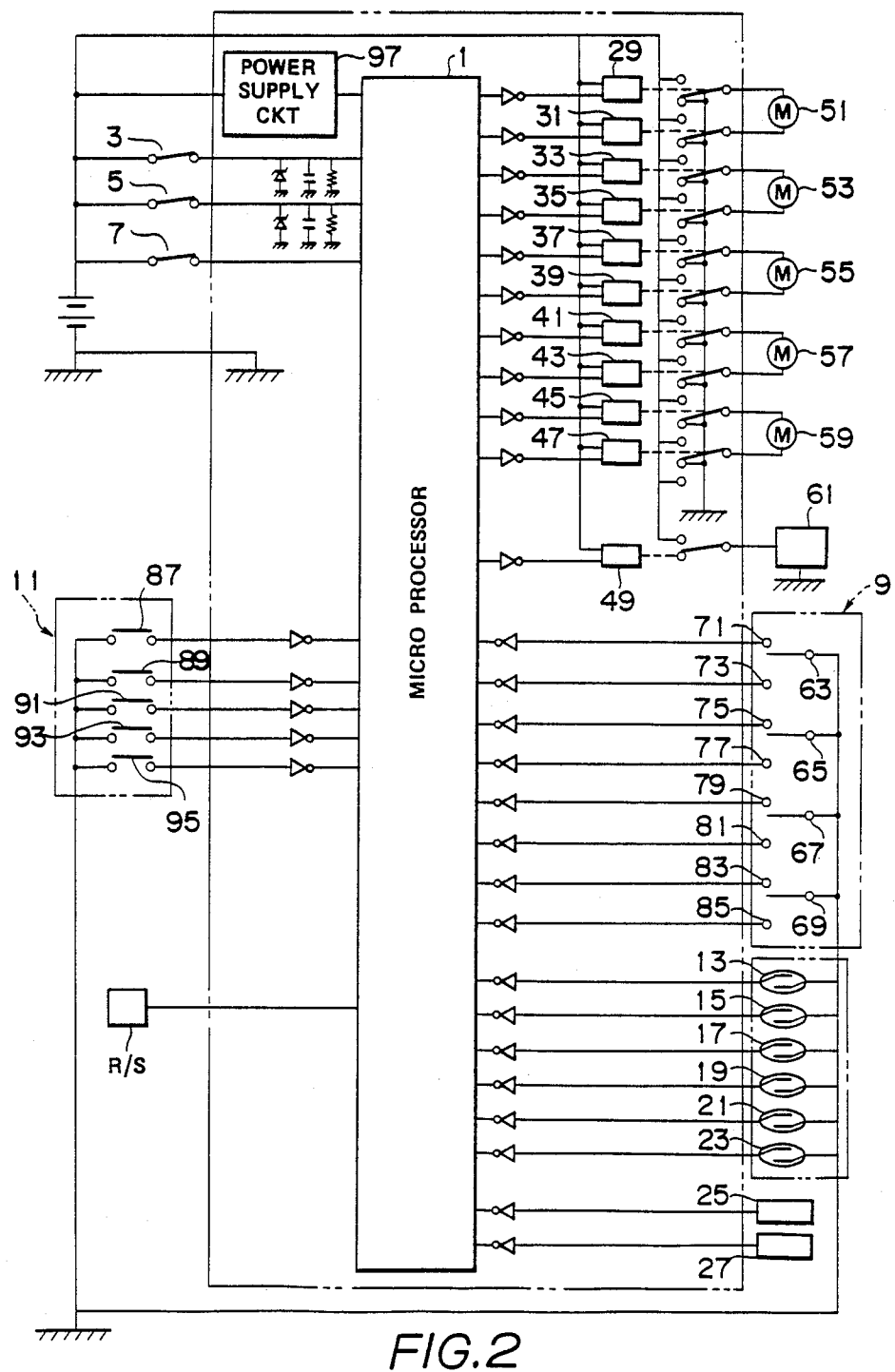
FIG. 2 is a diagram showing some of the hardware and circuitry utilized in the first embodiment of the present invention.

FIG. 2 shows details of the hardware used in connection with the first embodiment of the instant invention. In this arrangement control circuit includes a mircroprocessor 1 which although not specifically illustrated, includes a RAM, ROM, CPU and input and output interfaces. These elements are all formed on a single LSI type chip. In this instance the ROM includes programs which selectively sample input data and derive suitable control commands in accordance therewith. The nature of the these programs will become more clear when a discussion of the flow charts shown in FIGS. 3, 4, 5 and 6 are made hereinlater.

The input interface of the microprocessor 1 is operatively connected to an engine ignition switch 3, door switch 5, a buckle switch 7, a manually operable position adjustment switch unit 9 and a manually operable position/orientation control switch unit 11.

In addition to these elements the input interface is also connected with a steering wheel tilt degree sensor 13, an extension (telescoping) sensor 15 which indicates the degree by which the telescopic steering column is elongated, a seat slide or position sensor 17, a seat lift or height sensor 19, a primary seat belt slack adjustment (wind in or retraction amount) sensor 21, a secondary seat belt slack adjustment (wind out or elongation amount) sensor 23, a vehicle speed sensor 25 which produces a pulse train the frequency of which is indicative of vehicle speed, and acceleration sensor 27 which is arranged to be responsive to low vehicle accelerations.

The output interface of the microprocessor is connected to relays 29, 31, 33, 35, 37, 39, 41, 43, 45, 47 and 49. As shown, relays 29, 31 are connected with a steering column tilt motor 51; relays 33, 35 are connected with steering column extension (telescoping) servo motor 53; relays 37, 39 are connected with a seat slide servo motor 55; relays 41, 43 are connected with a seat lift or height control motor 57; relays 45, 47 are connected with seat belt retractor motor 59; and relay 49 is connected with a solenoid 61 which forms part of a so called tensionless control arrangement in the seat belt retractor.

In the illustrated embodiment the rear seat passenger detection device S/R is arranged to input a signal indicative of the presence of a rear seat passenger directly to the input interface of the microprocessor.

Figure 6:
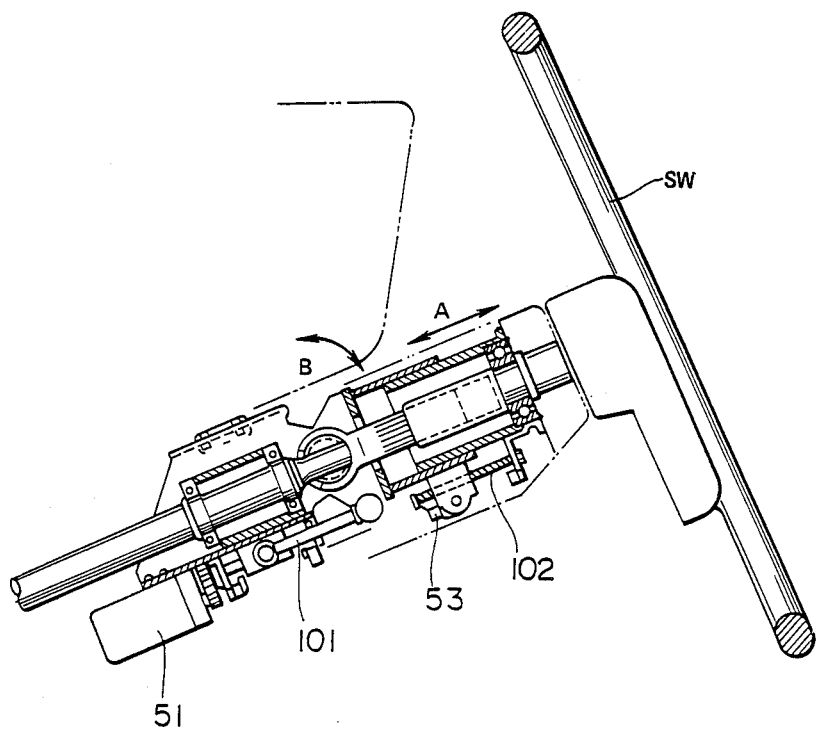
FIG. 6 is a side sectional elevation showing the construction of a steering column which includes servo means for controlling tilting and extending thereof.

As shown in FIG. 6, when the motor 51 which controls the degree of extension of the telescopic steering column, is energized a shaft 101 which is operatively connected therewith induces the steering column to tilt about a suitable universal joint (not numbered) in a manner shown in arrow B. On the other hand, when elongation or telescoping control motor 53 is energized the length of the steering column is varied in the manner illustrated by arrow A.

Figure 7:
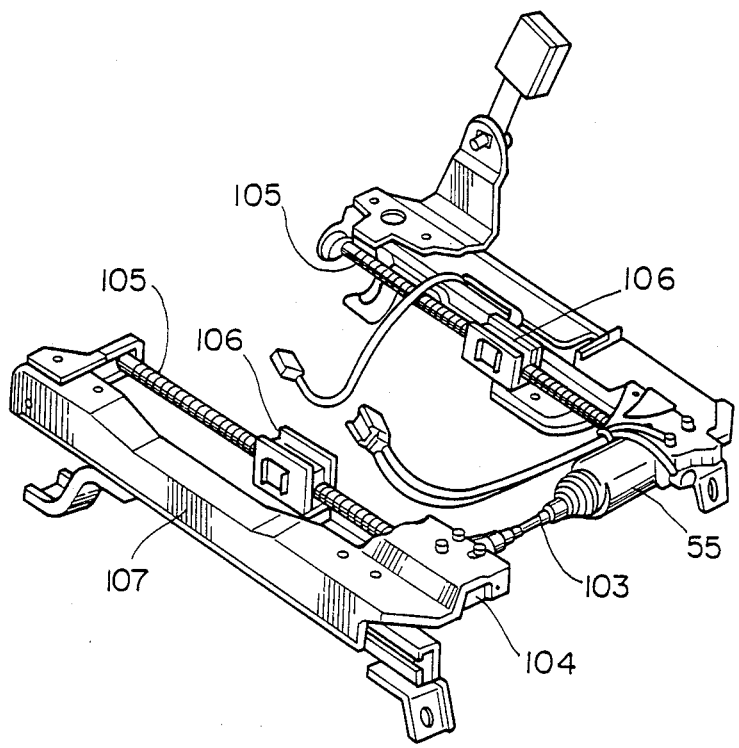
FIG. 7 is a perspective view showing a mechanism via which the seat is driven in the fore and aft direction of the vehicle.

FIGS. 7 and 8 show details of the construction which enable the seat to be selectively moved along support rails 107. In this arrangement when the seat slide motor 55 (as it will be referred to hereinafter) is energized, the output of the motor 55 is transmitted by a flexible wire cable 103 and worm gear 104 arrangement to lead screws 105. Screw nuts 106 are mounted on the lead screws 105 and connected to slide outers 107 in a manner wherein, when the motor 55 is energized the seat proper which is mounted on the slide outers 107 is selectively moved either forward or backwards depending on the rotational direction in which the motor 55 is being energized. Of course as will be appreciated, the rotational direction of the motor 55 is controlled by selectively controlling the passage of current through relays 37 and 39.

The seat lift or height control arrangement is such that when motor 57 (see FIG. 2) is energized the output of the same is transmitted to side gear 108 (see FIG. 8). The rotation of gear 108 is transmitted to a sector gear 109 which meshes with the former element and which is arranged to be pivotal about an axis A.

The movement of the side gear 108 is transmitted to a rear link 111 by way of connection link 110 and induces the seat to rise and fall in accordance with the positioning of the side gear. For further details concerning the construction and arrangement of this device reference may be had to NISSAN SERVICE MANUAL 517 D - 36).

Figure 10:
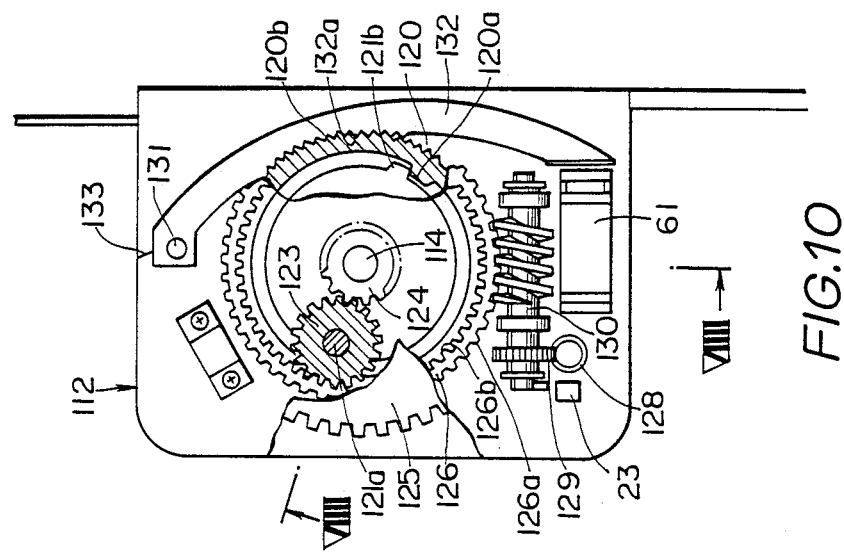
FIG. 10 is a front sectional elevation of the mechanism shown in FIG. 9 as taken along section line XII—XII of said figure.
Figure 9:
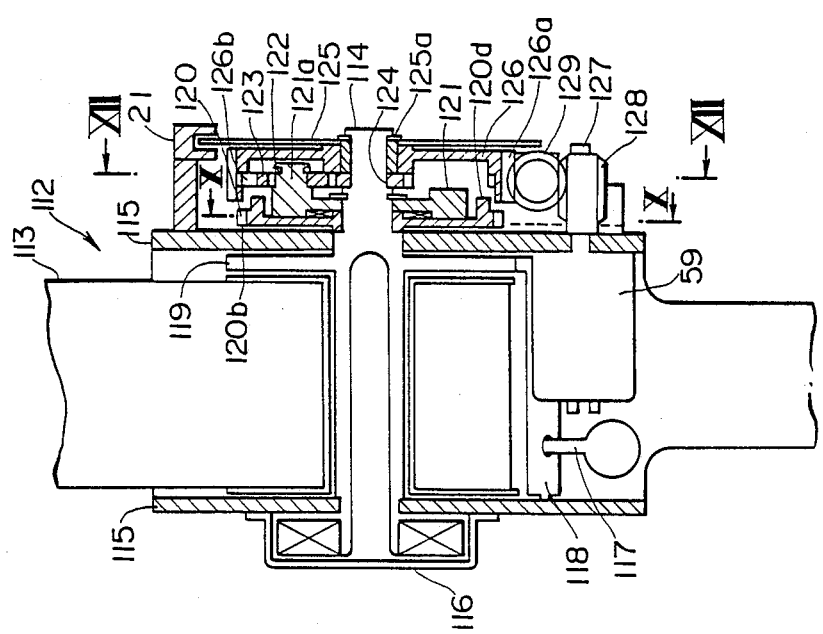
FIG. 9 is a side sectional elevation of a seat retractor mechanism used in the embodiments of the present invention, as taken along section line VIIII—VIIII of FIG. 10.

FIGS. 9 and 10 show the construction of the seat belt retractor 112 shown in FIG. 1. As shown, this arrangement is arranged to wind the seat belt 13 about a shaft 114 which is rotatably supported within a housing 115. One end of the shaft 114 is operatively connected with a spring 116. The retractor further includes an acceleration responsive member 117 (G sensor) which is operatively connected to a lock element 118. when the, G sensor is subject to an acceleration in excess of a predetermined level the lock element 118 is moved into engagement with a ratchet gear 119 formed integrally on the shaft 114. An annular sleeve 120d is formed with a projection 120a on its inner periphery and with a plurality of teeth on its outer periphery. The latter mentioned teeth define a first ring gear 120. A carrier 121 is disposed within the annular sleeve 120d and rotatably supported on the shaft 114. The carrier is formed with a first projection 121a on which a planetary gear 123 is disposed and a second projection 121b. A spring 122 is interposed between the carrier 121 and the annular sleeve 120d and arranged to bias the projections 120a and 121b into engagement.

A sun gear 124 is mounted on the shaft 114 and arranged to mesh with the planetary gear 123. A slit wheel 125 is also mounted on the shaft 114. The slit wheel includes a boss 125a on which a second ring gear 126 is rotatably supported. This gear 126 includes a first set of teeth 126a formed external periphery and a second set of teeth 126b on the inner periphery. The inner teeth 126b are arranged to mesh with the planetary gear 123.

In this embodiment the motor 59 includes an output shaft 127 on which a worm 128 is disposed. A worm wheel 129 is arranged to mesh with the worm 128. This element is mounted on a shaft on which a second worm 130 is formed. The second worm is arranged to mesh with the teeth 126a formed on the external periphery of the gear 126.

A lever 132 is pivotally mounted on a pin 131 formed on the housing 115. One side of the lever is formed with a rack of teeth 132a which are selectively engageable with the teeth 120b formed on the annular sleeve 120. A spring 133 is arranged to bias the lever 132 in a direction which moves the teeth 132a out of engagement with the teeth 120b. The solenoid 61 is arranged so that when energized the lever is pivoted against the bias of the spring 133 and moved to a position wherein the teeth 132a and 120b engage and prevent rotation of element 120.

The above mentioned lever 132, spring 133 and solenoid 61 define the essence of the previously mentioned tensionless mechanism.

The so called "wind in" sensor 21 is mounted on the housing 115 and arranged to cooperate with the slit wheel 125. The "wind out" sensor 23 is also mounted on the housing 115 and arranged to be responsive to the energization of the motor 59 in a manner which enables the rotational angle of the shaft 114 to be ascertained.

Figure 11:
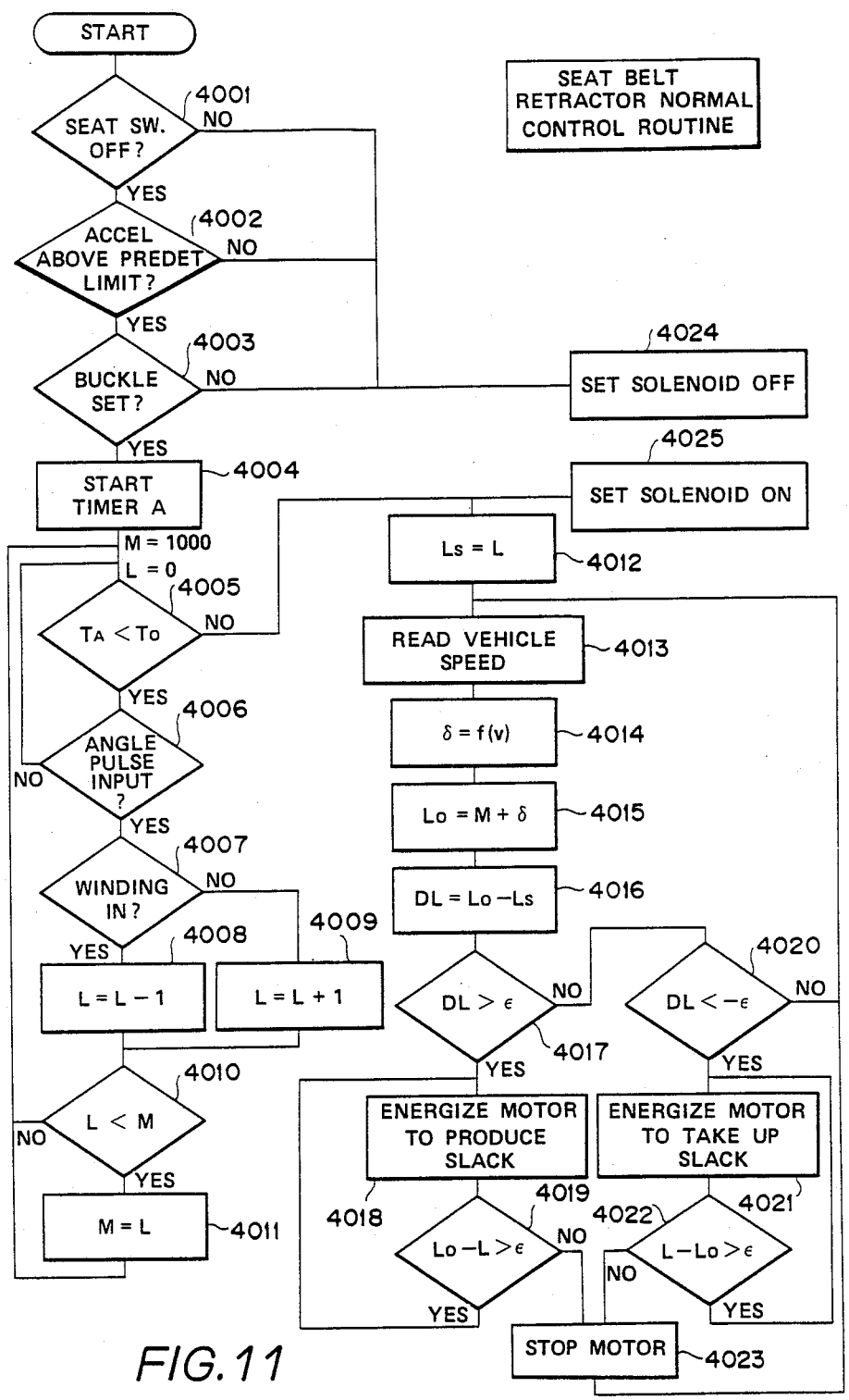
FIG. 11 is a flow chart showing the operations which can be performed in order to control the seat retractor device shown in FIGS. 9 and 10.

The operation of the above disclosed type of seat belt retractor is disclosed in the flow chart shown in FIG. 11. As shown, when the seat is not being moved on its rails, the program flows from step 4001 to step 4002 wherein the output of the acceleration sensor 27 is sampled and the determination made if the vehicle is moving and subject to a predetermined small amount of acceleration or not. If the outcome of this inquiry is negative indicating that the vehicle is not moving, then the program flows to step 4024 wherein a command to de-energize solenoid 61 is issued. This permits the lever 132 to assume a position wherein it does not engage the teeth formed on element 120.

However, in the event that a positive outcome is derived then at step 4003 the status of the seat belt buckle switch 7 is sampled. In the event that the buckle has not as yet been set (engaged) the program goes to step 4024. On the other hand, if the buckle switch is found to be closed then at step 4004 a timer A is initiated. This timer ensures that from the time that the seat buckle is closed, the solenoid 61 will remain off for a predetermined amount of time and allow the seat belt to be freely drawn out of the retractor to permit any necessary adjustment or movement before settling down into the required position.

At step 4005 the instant value of the timer A is checked. If the time period for which the timer A has counted is less than a predetermined value To then the program flows to step 4006. However, once the timer A count is no longer less than To then the program flows to step 4025 wherein a command to energize the solenoid 61 is issued.

As will be appreciated once the solenoid 61 is energized the rotation of element 120 is prevented by engagement with arm 132 and free or tensionless movement of the belt is no longer possible.

At step 4004 in addition to the starting of timer A, minimum (M) and actual (L) amounts of seat belt which can be taken off the retractor are set in memory.

In this instance initially M is set=1000 while L is set=0.

At step 4006 the output of sensors 21 and 23 are sampled to determined if pulse signals have been issued therefrom. If the outcome of this inquiry is negative then the program recycles to step 4005 while in the event of a positive outcome the program goes to step 4007 wherein it is determined if a length of belt has be wound into the retractor. This can be done by sampling the output of sensor 21 which is arranged to indicate the amount of belt which is wound into the retractor 112. In the event of a positive outcome then at step 4008 the instant value of L is incrementally decreased while in the event of a negative outcome the value of L is incrementally increased (step 4009).

At step 4010 the values of L and M are compared and in the event that L is less than M, then at step 4011 the value of M is updated to equal the instant value of L.

It will be noted that during the above operations solenoid 61 is de-energized and the arm 132 is permitted to assume a position wherein so called tensionless operation of the retractor is permitted. That is to say, in the event that a length of belt is wound into the retractor under such conditions, the shaft 114 rotates in the clockwise direction, the gear elements 120 and 121 rotate in the same direction and the planetary gear 123 is free to rotate in the anticlockwise direction. Hence, when a passenger is putting the belt on the chance of an unwanted amount of slack developing between the belt and the passengers body is prevented.

At step 4005 when the count TA becomes equal to To in addition to the solenoid 61 being energized the instant length of seat belt Ls which wound onto the shaft 114 is detected in the form of the rotational angle output from sensor 21. This value is set in RAM as the instant L value. Following this at step 4013 the output of the vehicle speed sensor 25 and the L value is set in RAM for further processing. At step 4014 a factor delta representative of the desired amount of seat belt slack as a function of vehicle speed is calculated. At step 4015 a target seat belt slack value Lo is calculated by adding the minimum amount of belt release M to the just calculated value of SIGMA. Following this DL is calculated by determining the difference between Lo and Ls.

At steps 4017 and 4020 the value of DL is ranged against positive and negative values of a factor epsilon. This factor is selected to prevent hunting of the retractor operation. In the event that DL is found to be greater than +epsilon then at step 4018 motor 59 is energized to rotation in a direction which causes seat belt to unwind from the shaft 114. At sep 4019 it is determined if sufficient slack has been produced or not. When sufficient belt has been wound out of the retractor the program goes to step 4023 where a command to stop the operation of the motor 59 is issued.

However, in the case that DL is found to be less than −epsilon then at step 4021 motor 59 is energized in the reverse direction and thus induces belt to be wound onto the shaft. At step 4022 the amount of slack which has been produced is compared with the value L−Lo. When the appropriate value is reached the motor 59 is stopped. Prior the program going from step 4022 to 4023 the program loops back through steps 4013 and updates the value of DL in accordance with the instant vehicle speed.

Returning to FIG. 2 it will be noted that the hardware involved in the present invention further includes a switch 3 responsive to the position of the engine ignition switch, a door switch 5 which is closed when the door is open, and the previously mentioned buckle switch 7. The manual adjustment switch unit 9 includes movable contacts 63, 65, 67 and 69 and corresponding stationary contacts 71, 73, 75, 77, 79, 81, 83 and 85, arranged as shown. The switch unit 9, and relays 29 to 35 are arranged to selectively control the operation of the steering column tilt and extension motors 51 and 53. The switch unit 9 and relays 37 to 43 are arranged to control the seat slide and lift motors 55 and 57, while the switch unit 9 and relays 45, 47 and the seat belt retractor motor 59 are arranged in the form of seat belt winding control means, and relay 49 and solenoid 61 are arranged as the tensionless control means.

The orientation/position control switch unit 11 includes a main switch 87, and memory position switches 89, 91, 93 and 95. In this instance these switches take the form of momentarily open type devices which are connected to the microprocessor via inverters (no numerals).

The memory of the mircroprocessor is divided into 5 banks. The first four of the banks are arranged to be selectively accessible while the fifth is arranged to act as working memory which is constantly open and to be written when any of the switches of unit 9 are pressed to adjust the instant setting of the steering wheel and seat.

By way of example, when the driver wishes to adjust the seat and steering wheel positions, all that is necessary is to manipulate the switch unit 9. For example, if it is desired to adjust the angle of the steering wheel, the driver can close movable contact 63 with one of stationary contacts 71 to 73. By way of example, assume that contacts 63 and 71 are brought into contact. Under these conditions the mircroprocessor 1 reacts and induces the energization of relay 29 as long as the just mentioned contacts are maintained in contact with one another. This in turn causes current to pass through the tilt motor 51 in a manner which increases the angle of the steering column (by way of example only). On the other hand, if contacts 63 and 73 are brought into contact the reverse situation when relay 31 is energized and motor 51 induced to run in the reverse direction. This of course induces the angle of the steering column to decrease.

The amount of extension of the steering column, the position of the seat and the height of the same can be similarly adjusted by closing the appropriate contacts for the appropriate length of time.

When all of the variables are adjusted to the drivers liking, manipulation of switch unit 11 enables the instant set of data to be memorized. For example, by setting the main switch 87 on and subsequently pressing switch 89, the instant outputs of the tilt sensor 13, the extension sensor 15, seat slide sensor 17 and the seat lift sensor 19 are stored in the first memory bank of the mircroprocessor 1 as standard counter values.

With the present invention, even if the switch unit 11 is not used, all of the above mentioned values are automatically written into the fifth memory bank of the microprocessor. This section of the memory is the one that is accessed during running of control programs.

By closing switch 91 while the main switch 87 is on, it is possible to transfer the data in bank 5 to any of the other four memory banks in a manner which overwrites any data that may have been stored previously therein.

Hence, with the present invention it is possible to record four (in this instance) sets of data (in memory sections 1 to 4) and thus allow for four different drivers to record their preferential settings. These settings can be installed in the fifth memory section by pressing the appropriate one of the switches 89, 91, 93 and 95 with the main switch off.

Of course the present invention is not limited to just the above mentioned variables and settings for such variables as the door or external rear vision mirror settings, the angle of reclination of the seat back and others can be memorized by suitably increasing the number of switches and memory sections available.

The operation of the first embodiment will become more clearly appreciated as an explanation of the content of the flow charts shown in FIGS. 3A to 3D is made hereafter.

Figure 3A:
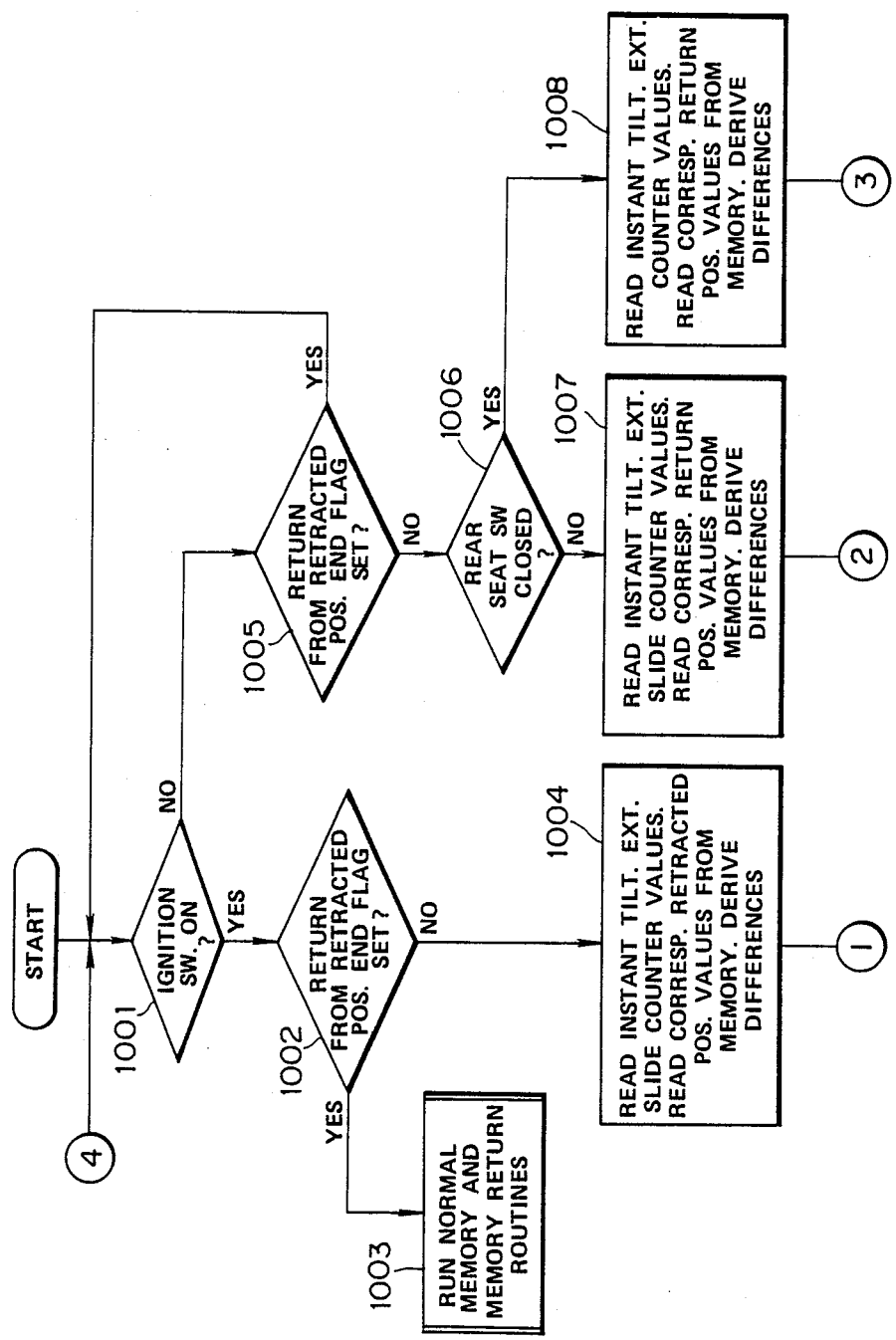

As shown in FIG. 3A in step 1001 the instant status of the ignition switch 3 is sampled. In the event that the switch is found to be off then it is assumed that the driver (or passenger) will alight from the vehicle and the program goes to step 1005 which marks the beginning of a series of the controls which move the seat and other elements to their fully retracted positions and thus maximize the ease with which ingress and egress from the vehicle can be accomplished.

On the other hand, in the event that the ignition key is found to be on then the program flows to step 1002 to enter into one of two possible streams of operation.

At step 1005 the presence or absence of a return to a retracted position flag is checked. If this flag has been set then the program simply loops back to step 1001 to again sample the condition of the ignition switch.

However, in the event that this flag has not been set then at step 1006 the output of the rear seat passenger detection device S/R is sampled. If this switch is open then it is assumed that there is no one seated in the rear of the vehicle (for example behind the drivers seat) who would be inconvenienced by the rearward movement of the forward seat. In this instance the program flows to step 1007 wherein the instant seat slide value and steering column tilt and extension values are derived by sampling the outputs of the appropriate sensors (17, 13, 15). At this step the corresponding values which occur when the seat and steering column assume fully retracted positions are also read out. The differences between the corresponding values are then calculated and set in place in RAM.

On the other hand in the instance that the outcome of the inquiry performed in step 1006 indicates that the switch is closed and that there is someone seated in the rear of the vehicle who would be inconvenienced by the rearward sliding of the seat, then the program goes to step 1008. In this step the data relating to the seat sliding control is omitted. Alternatively, in lieu of omission it is possible to arbitrarily set the retracted seat position value equal to the instant value and thus obviate any operation of motor 55.

Figure 3B:
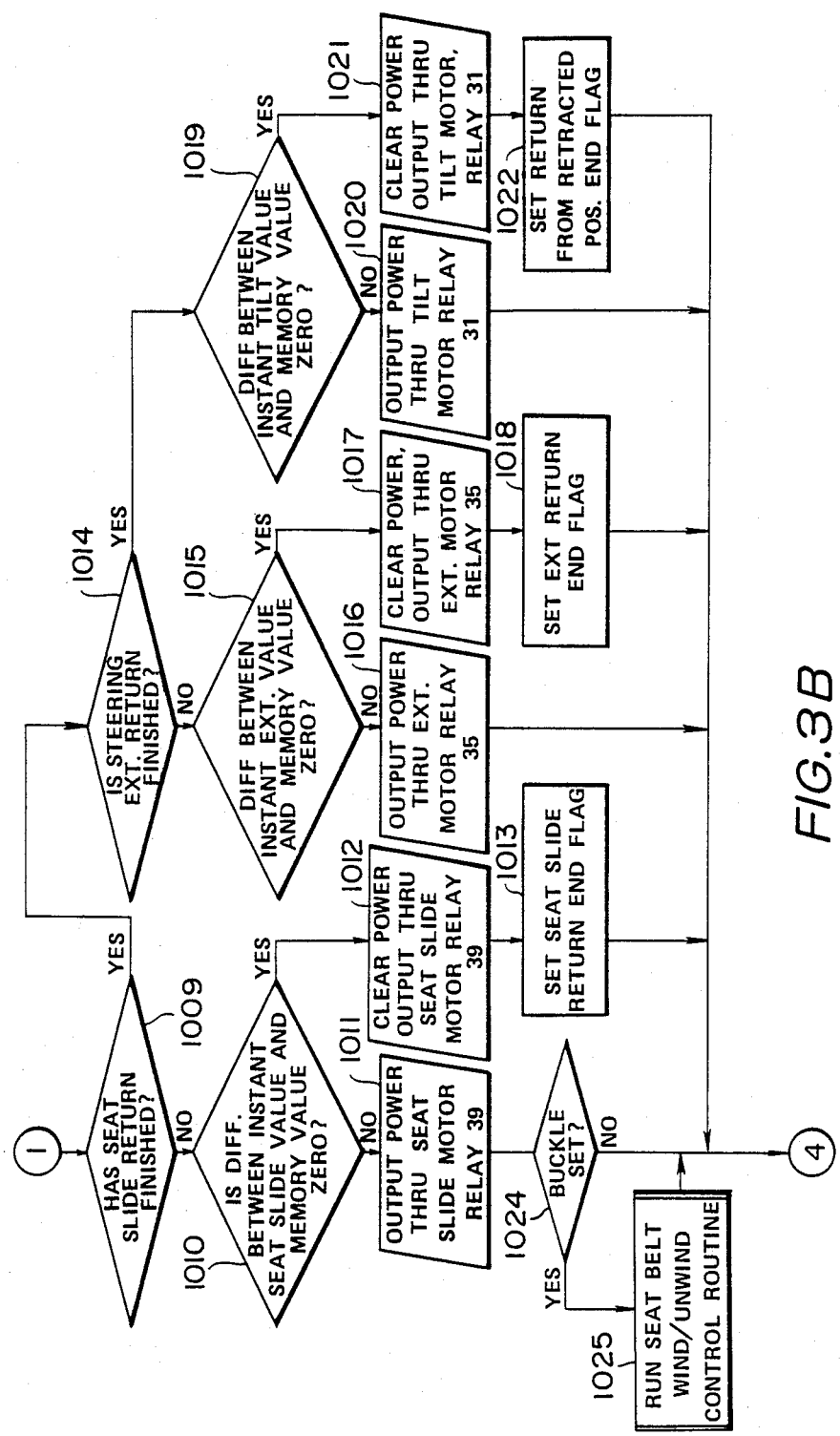
Figure 3D:
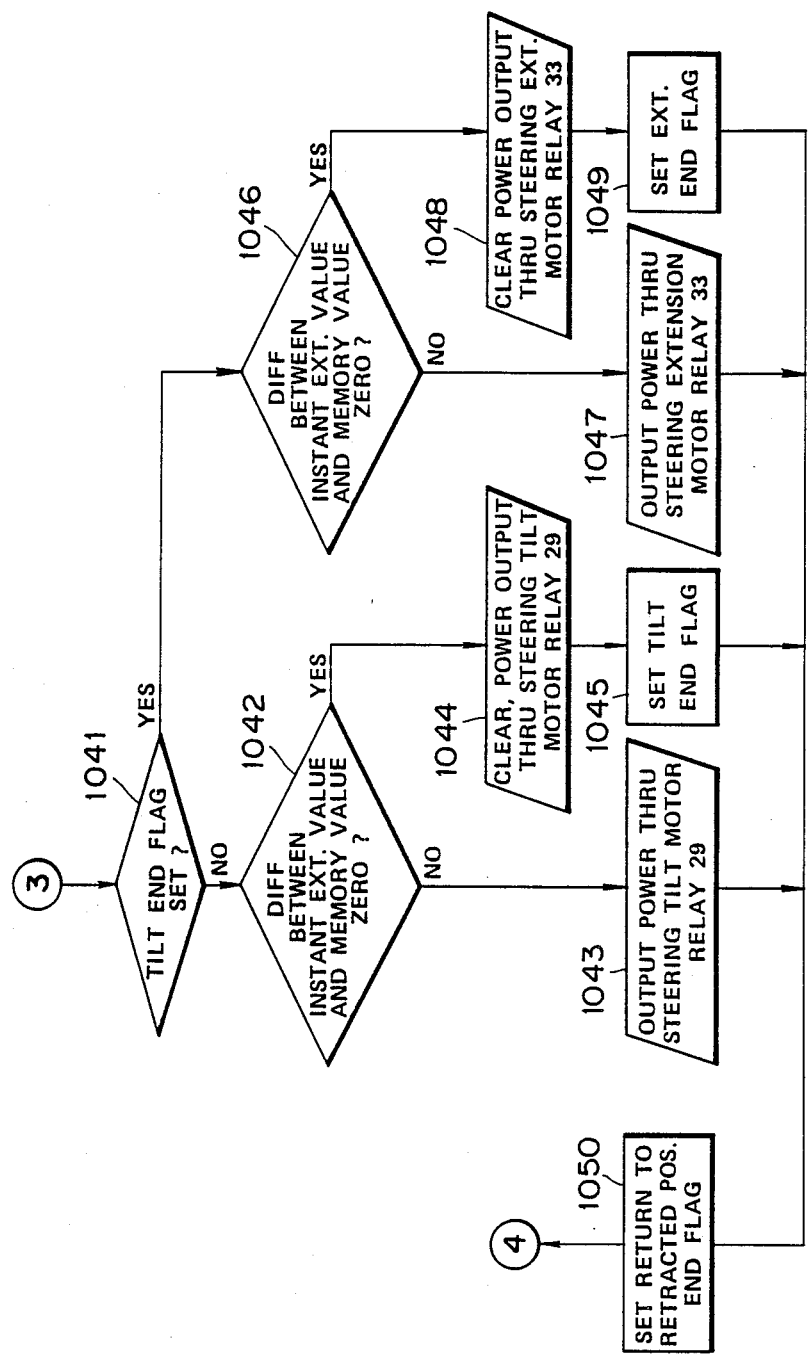

The control steps which are executed following steps 1004, 1007 and 1008 are shown in FIGS. 3B–3D, respectively.

As shown in FIG. 3B following step 1004 it is determined at step 1009 if the seat sliding from the retracted position to the desired driving one is finished or not. This can be done by determining the presence or absence of a seat slide return end flag. If this flag is not yet set, then at step 1010 the magnitude difference between the instant seat slide value and required value is determined. In the case that the value is not zero, a command to output power through seat slide motor relay 39 is issued. This energizes (or continues to energize) the seat slide motor 55 and moves the seat forward.

At step 1024 the instant status of the buckle switch is determined. In the event that the buckle is not yet set then the program returns to step 1001. On the other hand, if the buckle switch indicates the buckle is closed then a seat belt wind/unwind control routine is run (step 1025). This routine of course is designed to take into account the movement of the seat and prevent any undesirable tensioning which is apt to cause the passenger discomfort.

In the first embodiment this routine takes the form of that shown in the flow chart of FIG. 4 and which will be disclosed hereinlater.

However, in the event that no difference exists between the values compared in step 1011 then the program flows to step 1012 wherein the power supply to the seat slide motor 55 is stopped and subsequently to step 1013 wherein the seat slide return end flag is set.

Steps 1014 to 1018 monitor and control the elongation of the steering column while steps 1019 to 1021 monitor and control the tilting movement of the column. At step 1022 a flag indicating the completion of all of the tasks is set.

Following step 1007 the program goes to step 1026 wherein it is determined if the tilt end flag has been set or not. If the answer is no then at step 1027 the magnitude of the difference between the instant tilt counter value and the fully retracted value is determined. If the difference is not yet zero then at step 1028 a command which induces power to be output through relay 29 to motor 51 is issued.

On the other hand, if the difference between the instant and memory values is zero then at step 1029 a command which clears or stops power output through tilt motor relay 29 is issued and a "tilt end" flag is set (step 1030).

At steps 1031 to 1034 a similar process is conducted to bring the degree of extension of the steering column to that which agrees with the current value resident in memory and to set a flag when the value is reached.

Steps 1035 to 1038 are such as to move the seat to a fully retracted position and set a flag indicative of the position begin reached. Steps 1039 and 1040 determine if all of the three operations—viz., tilting, extending and sliding are complete or not and set a flag indicative of all variables having assumed a fully "retracted" status in response to the stoppage of the engine.

Following step 1008 the program goes to step 1041. As will be noted steps 1041 to 1049 are essentially the same as steps 1026 to 1034 described hereinabove. The only difference being that the steps which control the movement of the seat slide motor 55 have been omitted to prevent the passenger in the back seat from being undesirably subject to a sudden reduction in leg room.

At step 1050 the return to retracted position end flag is set and the program flows back to step 1001.

FIG. 4 shows in flow chart form one of two examples of seat belt winding control routines. The control provided by the first routine is such as to induce the seat belt retractor 112 to positively unwind seat belt from the device in the event that the seat is moving forward and to positively wind in the reverse direction in a manner to take up slack, in the event that the seat is moving in the opposite direction. The operation provided by this routine is deemed evident from the flow chart and as such no redundant disclosure of the same will be given for brevity.

Figure 5:
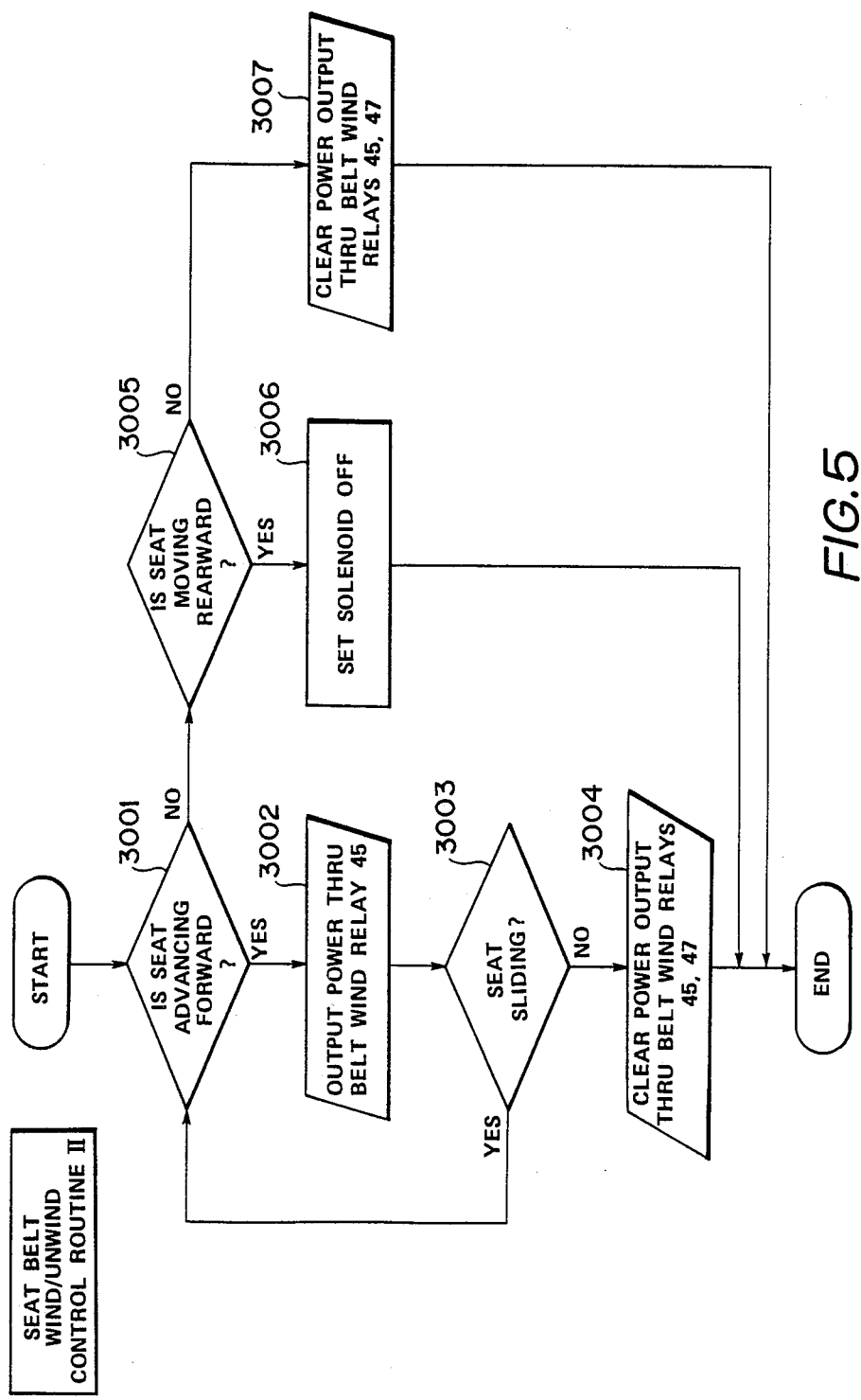
FIG. 5 is a flow chart which shows the operations which characterize a second alternative seat belt slack control routine.

FIG. 5 shows a seat belt winding control routine according to a second embodiment of the present invention. This routine differs from the first in that instead of winding out belt from the retractor under the control of the motor 59 the solenoid 61 is de-energized so as to establish the tensionless state which allows the slack to be taken up under the control of the spring 116.

Of course the present invention is not limited to the above disclosed forward and rearward movement of the seat and control steps which sense changes in height of the seat and/or changes in the angle of reclination of the seat back can also be sensed and taken into account if so desired.

It will be noted that the omission of the seat belt control is within the scope of the present invention and that the invention can be applied to vehicles wherein such means are not provided. For example in the event that the vehicle is provided with a safety restraint arrangement such as an air-bag or the like then the seat belt controls can be omitted for obvious reasons. Alternatively, if the seat belts are connected to the seat structure and movement of the seat has no influence on the tension/slack therein then the omission is again deemed proper.

What is claimed is:

1. In vehicle
   a front seat;
   a rear seat;
   means for detecting the presence of a passenger on said rear seat;
   means for selectively moving the front seat forward and aft within said vehicle;
   a switch, said switch being associated with the operation of said vehicle, said switch having a first state and a second state, said first state being automatically assumed when the vehicle is conditioned to be driven, and said second state being automatically assumed when said vehicle is conditioned so that a passenger can ingress or egress from said vehicle; and
   a circuit including a memory, said memory being arranged to be conditioned to retain a first predetermined seat position and a first selectable seat position, said circuit being operatively connected with said seat moving means, said circuit being arranged to induce said seat moving means to automatically move said seat to said first predetermined position from the first selected seat position when said rear seat passenger detecting means indicates the absence of a passenger thereon and said switch assumes said second state.

2. A vehicle as claimed in claim 1 further comprising a steering wheel;
   means for selectively moving said steering wheel between a second predetermined position and a second selectable driving position,
   said memory being further arranged to retain said second predetermined position and said second selectable position, and
   said circuit being further operatively connected with said steering wheel moving means in a manner to move said steering wheel to said second predetermined position when said seat is moved to said first predetermined position and to moves to said steering wheel to said second selectable driving position when said seat is moved to said first selectable position.

3. A vehicle as claimed in claim 1 wherein said memory is arranged to memorize a plurality of first selectable seat positions, and is able to selectively induces a selected one of said plurality of first selectable seat positions upon demand.

4. A vehicle as claimed in claim 3 further comprising:
   a device utilized during driving of said vehicle;
   means for moving said device;

said memory being arranged to memorize a plurality of preferred device positions, each of said plurality of preferred positions corresponding to one of said plurality of selectable positions, said circuit being arranged to moVe said device to a preferred position which corresponds to the selected one of said selectable seat positions.

5. In a method of operating a vehicle having a front seat and a rear seat, the steps of:
  memorizing a first predetermined front seat position wherein ingress and egress from said vehicle is facilitated;
  memorizing a first desired front seat position suited to drive said vehicle;
  moving said front seat to said first predetermined position in response to a first signal, said first signal being automatically produced in accordance with vehicle operation and indicative that the vehicle has assumed a condition wherein a passenger can either ingress or egress from said vehicle;
  moving said front seat to said first desired position in response to a second signal, second signal being automatically produced in accordance with vehicle operation and indicative of the vehicle being conditioned to be driven;
  sensing the presence of a passenger on said rear seat; and
  inhibiting said front seat from moving from said first desired position to said first predetermined one in response to the first signal in the event that said step of sensing indicates the presence of a passenger on said rear seat.

6. A method as claimed in claim 5 further comprising the steps of:
  memorizing a second predetermined position to which a steering wheel of said vehicle is moved to facilitate ingress and egress from said vehicle;
  memorizing a second desired position to which the steering wheel is moved to facilitate driving of said vehicle;
  moving said steering wheel to said second predetermined position in response to said first signal; and
  moving said steering wheel to said second desired position in response to said second signal.

7. A method as claimed in claim 5 further comprising the steps of:
  memorizing a plurality of first desired positions; and
  selectively using one of said plurality of desired positions.

8. A method as claimed in claim 6 further comprising the steps of:
  memorizing a plurality of second desired positions; and
  selectively using one of said second desired positions.

9. In a vehicle having a front seat and a rear seat:
  means for memorizing a first predetermined front seat position wherein ingress and egress from said vehicle is facilitated;
  means for memorizing a first desired front seat position suited to drive said vehicle;
  means for moving said front seat to said first predetermined position in response to a first signal, said first signal being automatically produced in accordance with vehicle operation and indicative that the vehicle has assumed a condition wherein ingress and egress from the vehicle is possible;
  means for moving said seat to said first desired position in response to a second signal indicative of the vehicle being conditioned to be driven;
  means for sensing the presence of a passenger on said rear seat; and
  means for inhibiting said seat from moving from said first desired position to said first predetermined one in the event that said sensing means indicates the presence of a passenger on said rear seat.

10. A vehicle as claimed in claim 9 further comprising:
  means for memorizing a second predetermined position to which a steering wheel of said vehicle is moved to facilitate ingress and egress from said vehicle;
  means for memorizing a second desired position to which the steering wheel is moved to facilitate driving of said vehicle;
  means for moving said steering wheel to said second predetermined position in response to said first signal; and
  means for moving said steering wheel to said second desired position in response to said second signal.

11. A vehicle as claimed in claim 9 further comprising:
  means for memorizing a plurality of first desired positions; and
  means for selectively using one of said plurality of desired positions.

12. A method as claimed in claim 9 further the steps of:
  means for memorizing a plurality of second desired positions; and
  means for selectively using one of said second desired positions.

* * * * *